United States Patent
Sonsino

(10) Patent No.: US 7,942,522 B2
(45) Date of Patent: May 17, 2011

(54) ILLUMINATED LOW-VISION SPECTACLES

(75) Inventor: Jeffrey Sonsino, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 1276 days.

(21) Appl. No.: 11/532,566

(22) Filed: Sep. 18, 2006

(65) Prior Publication Data

US 2010/0321630 A1      Dec. 23, 2010

Related U.S. Application Data

(60) Provisional application No. 60/721,544, filed on Sep. 29, 2005.

(51) Int. Cl.
    *G02C 1/00*      (2006.01)
(52) U.S. Cl. .................. 351/158; 351/41; 351/159
(58) Field of Classification Search ............ 351/41, 351/158, 159
    See application file for complete search history.

(56) References Cited

U.S. PATENT DOCUMENTS

| 5,125,046 A | 6/1992 | Siwoff |
| 5,151,722 A | 9/1992 | Massof et al. |
| 5,267,331 A | 11/1993 | Siwoff |
| 5,359,675 A | 10/1994 | Siwoff |
| 2003/0086054 A1 * | 5/2003 | Waters .................. 351/158 |

* cited by examiner

*Primary Examiner* — Huy K Mai
(74) *Attorney, Agent, or Firm* — Tim Tingkang Xia; Morris, Manning & Martin, LLP

(57) ABSTRACT

Lighted reading glasses for individuals with low vision. In one embodiment, the reading glasses include a frame for supporting lenses having an oculus dexter side and an oculus sinister side, at least one oculus dexter lens supported by the frame on the oculus dexter side, and at least one oculus sinister lens supported by the frame on the oculus sinister side, each of the at least one oculus dexter lens and the at least one sinister lens having an induced prism in a range between about 4 PD and about 22 PD and a lens power that is greater than about +4.00 diopters and less than about +20.00 diopters such that each of said lenses focuses at a distance that is greater than about 5 cm and less than about 25 cm, and at least one light source having a predetermined light strength oriented to project light to provide a predetermined lighted area in a predetermined field.

8 Claims, 1 Drawing Sheet

ILLUMINATED LOW-VISION SPECTACLES

Figure 1:
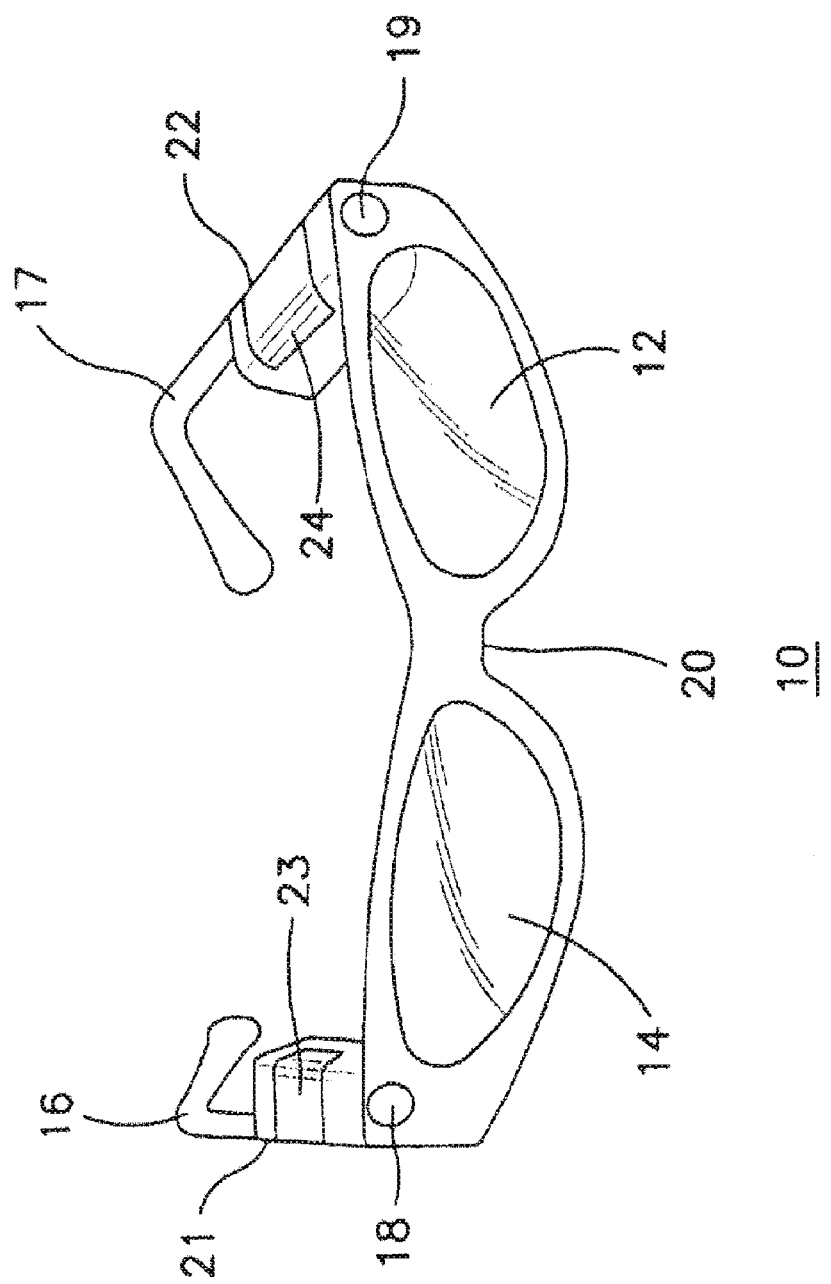

This application claims the benefit of U.S. Provisional Application No. 60/721,544 filed Sep. 29, 2005.

FIELD OF THE INVENTION

The present invention relates to a vision enhancement system for aiding in the correction of the vision of the visually impaired.

BACKGROUND OF THE INVENTION

Many people in the world today suffer from some type of visual impairment. Vision impairment refers to that which cannot be adequately compensated for by using corrective lenses (glasses or contact lenses) or surgery.

Low vision is generally considered to be vision poor enough to keep someone from being able to read the newspaper while wearing their habitual glasses. Visual acuity that results in this type of impairment can range anywhere from 20/20 (with a very constricted visual field) to 20/400 or worse, depending on the cause of the vision impairment. Low vision results from a variety of diseases or conditions. Age-related macular degeneration accounts for about 65% to 75% of patients requesting vision rehabilitation. Diabetic retinopathy, glaucoma, hereditary retinal degenerations or diseases such as retinitis pigmentosa, albinism, Leber's optic neuropathy, and Best's disease account for many other causes of low vision.

In order to cope with this disability, individuals work closely with a Low Vision Rehabilitation Specialist (an optometrist or ophthalmologist who has a special interest in and who has been trained in Low Vision Rehabilitation) or other professionals who specialize in specific aspects of low vision rehabilitation, such as occupational therapists, orientation and mobility instructors, educators who specialize in teaching both children and adults with poor vision, social workers and researchers. Low Vision Rehabilitation is available in most major medical centers and, in some cases, in private practices.

A Low Vision evaluation begins with a comprehensive patient history. This includes a medical, drug, social, work, and vision history. A meticulous refraction is then done to determine the patient's best possible visual acuity. Additional tests are done to determine what is needed to enable the patient to read. This correction may range from a simple pair of reading glasses to a magnifier or a complex system such as a telemicroscope or CCTV (closed circuit TV).

Other areas of the patient's lifestyle are addressed such as work needs, hobbies, social needs, recreational needs, financial and personal needs. For example, complex systems can be designed for someone who works on a computer and who needs large print or voice-activated programs. Every effort is made to enable the individual to continue working at his/her present job, or, if necessary, retraining individuals in new areas of employment.

Low Vision Rehabilitation is an approach to making the best possible use of the healthy vision remaining in the eye. The Low Vision Specialist has at her/his disposal a vast array of devices designed to help the visually impaired see better. These can include magnifiers, microscopic lenses, telescopes, electronic devices such as closed-circuit TV's, even virtual imagery. Proper lighting used in the proper manner, bold lined writing utensils and paper, large print books and magazines, large print checks and many other useful devices help with coping with vision loss.

In addition, individuals may need to work with an occupational therapist to learn to use these devices effectively. A social worker can identify community-based programs that may be beneficial. Most people who have had expert Low Vision Rehabilitation can read, write, use their computer and generally function at a relatively high level.

However, Low Vision Rehabilitation in no way affects the physical condition of the eye. It cannot make the disease better and it cannot make it worse. The goal of Low Vision Rehabilitation is to learn to use the remaining healthy vision as effectively and efficiently as possible.

A number of devices exist in the prior art for helping individuals cope with Macular Degeneration and other visual impairments. For example, U.S. Pat. No. 5,151,722 to Massof et al, incorporated by reference herein, discloses a head-mounted display for providing a monocular or binocular wide field of view. This display contains folding optics and a CRT for projecting a viewed image onto the eye. This and similar systems known as LVES (Low Vision Enhancement Systems), have a number of significant disadvantages. These systems are large, heavy and cumbersome and cannot be worn comfortably by the patient.

Because of their weight and awkward configuration, LVES systems also have the significant disadvantage that it is difficult for the patient to read effectively while wearing the unit and it is extremely difficult to move from place to place. This is because even very small amounts of movement will create image flutter and a blurring of the image that is projected onto the patient's eyes. This undesired motion and blurring of images causes the eyes to fatigue quickly and greatly increases eye strain.

These systems also cannot be used with a patient's normal prescription glasses because of their size and configuration, and the optics contained therein. Nor can they be readily optimized for changes in a patient's condition or even for different patients. Each unit must be customized for a particular condition and for a particular patient.

U.S. Pat. Nos. 5,125,046; 5,267,331, and 5,359,675, all of which are incorporated by reference herein, also disclose an image enhancement system for the visually impaired. This system is usable as a table-mounted display system or as head-mounted video spectacles. However, this system, like the LVES system, suffers from a number of significant disadvantages. These systems are also limited in that they cannot be easily reconfigured for the changing needs of the patient, and do not allow for the patient to wear his or her own prescription glasses while wearing the head-mounted enhancement system. This is a significant disadvantage in that the rehabilitation specialist cannot easily work with the patient while wearing the device to test and help improve the patient's vision. These systems also cannot be readily optimized for the needs of a different patient, but are instead designed and built for a specific application.

Because of these significant disadvantages inherent in conventional vision enhancement systems, a visual rehabilitation system is needed which significantly reduces the susceptibility of the system to motion, is easily adaptable to the changing needs of the patient, which can be readily optimized for the needs of different patients, and which will be a tremendous aid in the rehabilitation of patients coping with low vision and other visual impairments.

Thus, it should be apparent that a need exists for improved reading glasses or spectacles for aiding patients with low-vision or macular degeneration wherein the glasses use a single lens for each eye. It is an object of the present invention to provide improved low-vision enhancement systems.

SUMMARY OF THE INVENTION

The above and other objects are realized by the present invention, one embodiment of which relates to lighted reading glasses or spectacles for individuals with low vision, including macular degeneration, that provide enhanced viewing of text comprising:

a frame for supporting lenses having an oculus dexter side and an oculus sinister side, at least one oculus dexter lens supported by the frame on the oculus dexter side, and at least one oculus sinister lens supported by the frame on the oculus sinister side, the lenses being adjacent to and laterally spaced from each other and providing a predetermined field of view for a user, each of said lenses having an induced prism and a lens power sufficient to enhance the reading of text in the predetermined field view of the individual with low vision; preferably having an induced prism of between 4 and 22 PD and a lens power of between +4.00 and +20.00 diopters, and a pair of light sources each having a predetermined light strength and mounted adjacent the outer portions of the lenses and oriented to project light to provide a predetermined overlapping lighted area in the predetermined field of view.

BRIEF DESCRIPTION OF THE INVENTION

FIG. 1 is a perspective view of low-vision eyeglasses or spectacles of the invention.

DETAILED DESCRIPTION OF THE INVENTION

The present invention is predicated on the discovery that low vision in patients suffering therefrom can be vastly improved by employing lighted reading glasses wherein the lenses contain induced prism and the glasses are equipped with devices that project light onto the field of vision. The crux of the invention resides in the facts that (1) the lenses of the spectacles preferably have a dioptic power of from about +4.00 to about +20.00 and a prism preferably of from about 4 PD to about 22 PD and (2) the eyeglasses are able to project sufficient light on the area of focus to aid in the reading of written or typed information therein.

The eyeglasses or spectacles of the invention are far less bulky, transportable and easier to use than the reading aids heretofore employed for those with low vision.

The invention is further illustrated by reference to the drawing which depicts reading glasses or spectacles 10 according to the invention, in which are located, mounted in frame 20, lenses 12 and 14, each having a predetermined dioptic power and prism. The glasses are further provided with temple arms 16 and 17 for affixing the spectacles over the ears of the wearer. The temple arms, 16 and 17 are preferably hingedly connected to the frame 20 to allow folding of the glasses into a compact shape and size suitable for ease of carrying and transporting. Mounted on the glasses, preferably on the front of the frame 20 are light projectors 18 and 19, preferably LEDs that project light onto an area of focus 22. It will be understood by those skilled in the art that any type of light projector capable of projecting light onto the area of focus sufficient to aid the wearer in reading may be employed in place of the depicted LEDs. A light projector is preferably placed at each temple, i.e., the front of the frame 20 adjacent to the temple arms so as to focus at substantially the same distance that the lenses focus. The light projectors are also preferably provided with power sources (not shown) such as batteries, preferably located in housings 21 and 22, which are preferably mounted on the interior sides of temple arms 16 and 17, adjacent to the area at the rear of frame 20 which, in turn, is adjacent to light projectors 18 and 19. Each power source is preferably actuated by a switch means 23 and 24, which may be incorporated into housings 21 and 22 so as to either automatically effectuate supply of electrical power to the light projectors 18 and 19 when the glasses 10 are unfolded from their compact state for use by the intended wearer or so as to be manually operable by the intended wearer when desired or both. It will be understood that the invention also embodies the use of one or more than two light projectors in such applications where such arrangements are advantageous. The spectacles of the invention are preferably designed to focus at a maximum distance of 25 cm and a minimum of 5 cm (i.e., between +4.00 and +20.00 diopters).

The predetermined lighted areas of focus are designed to preferably comprise cones of light increasing in size further from the glasses so that the overlapping lighted area has a conical shape leaving only peripheral areas in the field of view of the lenses that are lit by a single one of the lights with the peripheral areas becoming progressively smaller as distances from the lenses increase.

The invention claimed is:

1. Lighted reading glasses for a user with low vision, comprising:
    a frame for supporting lenses having an oculus dexter side and an oculus sinister side;
    at least one oculus dexter lens supported by the frame on the oculus dexter side, and at least one oculus sinister lens supported by the frame on the oculus sinister side, each of said lenses being adjacent to and laterally spaced from each other and providing a predetermined field for the user, and each of said lenses having an induced prism in a range between about 4 PD and about 22 PD and a lens power that is greater than about +4.00 diopters and less than about +20.00 diopters such that each of said lenses focuses at a distance that is greater than about 5 cm and less than about 25 cm; and
    at least one light source having a predetermined light strength oriented to project light to provide a predetermined lighted area in said predetermined field.

2. The lighted reading glasses of claim 1, wherein the at least one light source comprises two light sources, each light source mounted adjacent the outer portions of the lenses oriented to project light to provide a predetermined lighted area overlapping said predetermined field.

3. The lighted reading glasses of claim 2, wherein the predetermined lighted areas are cones of light increasing in size further from the glasses so that the overlapping lighted area has a conical shape leaving only peripheral areas in the field of the lenses that are lit by a single light source with the peripheral areas becoming progressively smaller as distances from the lenses increase.

4. The lighted reading glasses of claim 1 wherein the at least one light source is a high intensity light-emitting diode.

5. The lighted reading glasses of claim 1 additionally comprising a power source for supplying electrical power for said at least one light source.

6. The lighted reading glasses of claim 5, wherein said power source is a battery.

7. The lighted reading glasses of claim 1 including elongate temple arms having forward and rearward ends with the arms extending rearwardly from adjacent the outer portions of the lenses.

8. The lighted reading glasses of claim 1 additionally comprising switch means for either automatically or manually effectuating a supply of electrical power to the at least one light source.

* * * * *

UNITED STATES PATENT AND TRADEMARK OFFICE
CERTIFICATE OF CORRECTION

PATENT NO.         : 7,942,522 B2                                Page 1 of 1
APPLICATION NO.    : 11/532566
DATED              : May 17, 2011
INVENTOR(S)        : Jeffrey Sonsino It is certified that error appears in the above-identified patent and that said Letters Patent is hereby corrected as shown below:

Column 3, line 14, in the summary of the invention, after "between 4 and 22" delete "PD" and insert --prism diopter ("PD")--

Signed and Sealed this
Twelfth Day of February, 2013

Teresa Stanek Rea
*Acting Director of the United States Patent and Trademark Office*